United States Patent [19]
Sargent

[11] Patent Number: 5,910,217
[45] Date of Patent: Jun. 8, 1999

[54] CAM ACTUATED APPARATUS FOR FRICTIONALLY CONTROLLING TRAILER SWAY

[76] Inventor: Frank T. Sargent, 5433 Brandy Cir., Fort Myers, Fla. 33919

[21] Appl. No.: 09/025,224

[22] Filed: Feb. 18, 1998

[51] Int. Cl.⁶ ........................................................ B60T 7/20
[52] U.S. Cl. ..................... 118/112 A; 280/455.1
[58] Field of Search .............................. 280/446.1, 455.1, 280/457, 477, 406.2, 492; 188/112 A, 112 R, 72.9

[56] References Cited

U.S. PATENT DOCUMENTS

| | | | |
|---|---|---|---|
| 3,787,077 | 1/1974 | Sanders | 280/446.1 |
| 3,825,282 | 7/1974 | Meinholdt | 280/446.1 |
| 4,003,586 | 1/1977 | Luck | 280/446.1 |
| 4,165,885 | 8/1979 | Good et al. | 280/446.1 |
| 4,306,734 | 12/1981 | Swanson et al. | 280/446.1 |
| 4,312,516 | 1/1982 | Olsen | 280/406.2 |
| 5,222,754 | 6/1993 | Few | 280/455.1 |
| 5,660,409 | 8/1997 | Hensley | 280/455.1 |

*Primary Examiner*—Peter M. Poon
*Assistant Examiner*—Pamela J. Lipka
*Attorney, Agent, or Firm*—William E. Noonan

[57] ABSTRACT

A cam actuated apparatus is provided for frictionally controlling trailer sway. The apparatus includes a support frame mounted to the trailer and accommodating an elongate sway bar, which bar pivotally engages and extends rearwardly from a ball mount on a standard trailer hitch. A brake assembly is mounted to the support frame and includes first and second brake components sandwiched about the sway bar. The brake components are mounted so as to be selectively compressible and separable with respect to one another and the sway bar. A cam element is mounted to the support frame such that the cam element is axially pivotable. The cam element is pivotally driven, such as by a handle or a motor driven worm gear, into a selected one of a plurality of positions. A resilient biasing assembly interengages the cam element and the brake assembly and is responsive to pivoting of the cam element into a selected position for applying a corresponding degree of compressive force to the first and second brake components. As a result, frictional adjustment between the brake components and the sway bar may be adjusted.

20 Claims, 5 Drawing Sheets

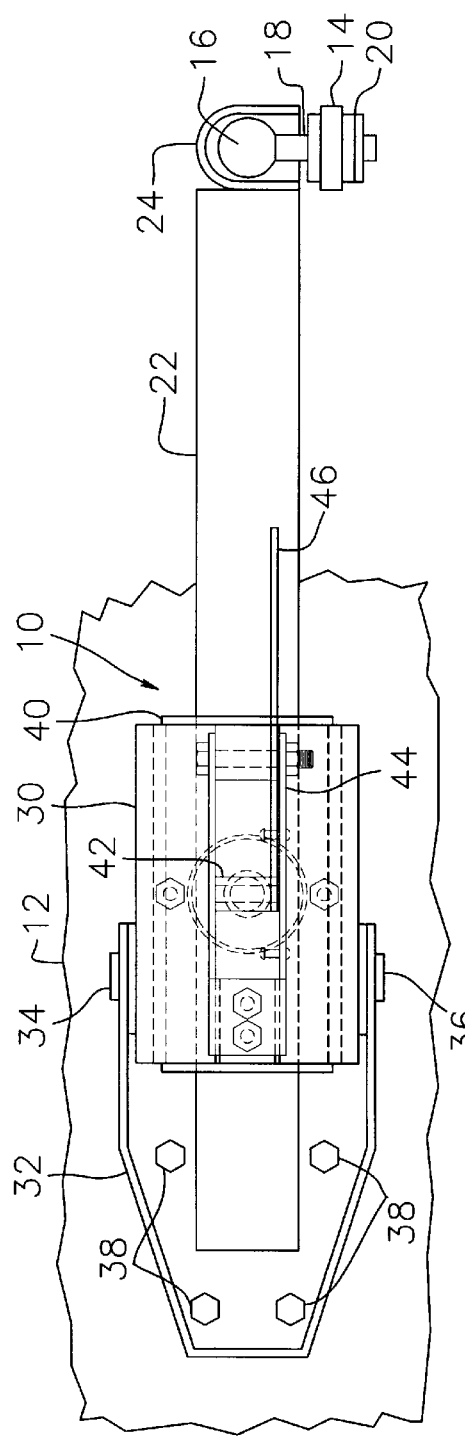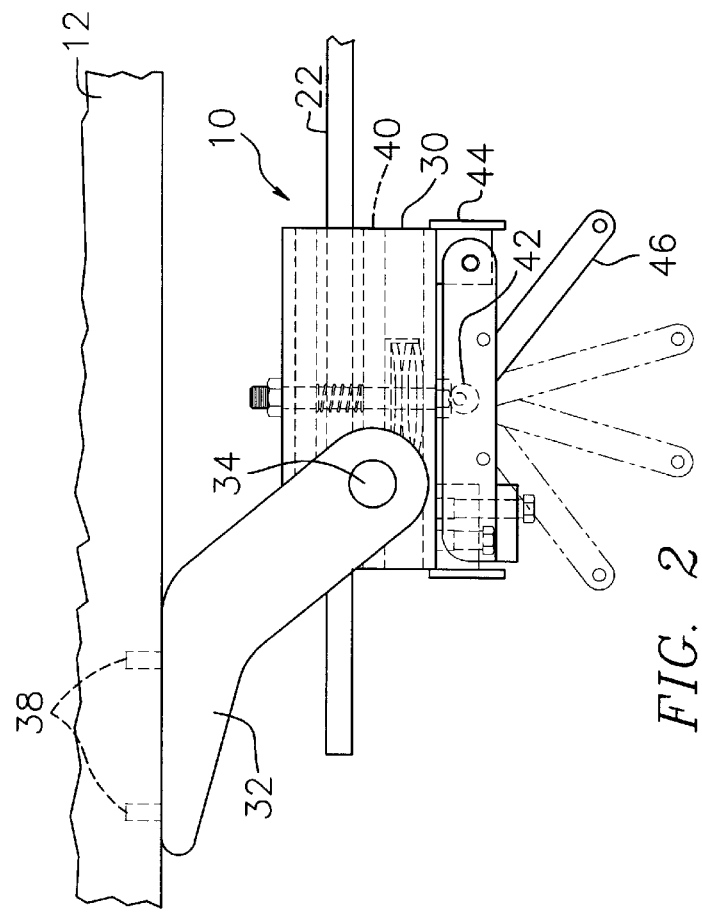

CAM ACTUATED APPARATUS FOR FRICTIONALLY CONTROLLING TRAILER SWAY

FIELD OF THE INVENTION

This invention relates to an apparatus for frictionally controlling the sway that is exhibited by a trailer pulled by a tow vehicle and, more particularly, to an apparatus that employs a cam actuated mechanism, which is adjusted to minimize sway at higher speeds and to permit convenient turning and maneuvering of the tow vehicle and trailer at low speeds.

BACKGROUND OF THE INVENTION

Trailers must be correctly balanced and hitched in order to avoid difficulties with handling and maneuverability. Nonetheless, even trailers that have been properly hitched and balanced can sway while traveling along the highway, particularly in windy conditions. Such swaying can be extremely hazardous and presents the risk of a serious accident.

To compensate for trailer sway, a number of sway control devices have been developed. A particularly popular device of this type is manufactured by Reese. The Reese device employs an elongate sway control bar that is pivotally interconnected to a small ball on the ball mount. A bracket is fixed to the A-frame of the trailer. This bracket carries a pair of brake shoes that are sandwiched about the bar. A rotatable handle selectively tightens and loosens the brake shoes against the bar so that the friction along the bar is adjusted. Typically, the brake shoes are tightened to increase friction at times when the trailer is to be pulled at higher speeds. This tightens the connection between the tow vehicle and the trailer and minimizes sway. However, a tight frictional interengagement is not desirable when the tow vehicle is turning at low speeds. In such cases, a tight interconnection between the sway bar and the A-frame of the trailer may prevent the tow vehicle from turning freely relative to the trailer. Because city or other low speed types of driving conditions must be anticipated, the operator cannot fully tighten the connection for high speeds, but must allow for movement at low speeds. This enables the tow vehicle to turn properly relative to the trailer. Such adjustment is not adequate for full sway control at high speeds in high windy conditions. For this reason, many operators install two sway controls—one on each side of the A-frame and hitch head.

Adjusting the friction on the Reese sway control device can present problems. Most significantly, it is fairly easy for the operator to overly tighten the handle. The operator is able to selectively tighten and loosen the handle by number of turns based on experience and advice. No markings are provided to indicate when maximum desired tightening has been achieved. Overtightening the brake shoes against the sway bar to provide for excessive wind conditions can cause the bar to bend or break. Overtightening can also bend the bracket which mounts the brakes to the trailer frame. In either case, the sway control mechanism may be damaged and rendered inoperable.

SUMMARY OF INVENTION

It is therefore an object of the present invention to provide an improved, cam actuated apparatus for frictionally controlling trailer sway.

It is a further object of this invention to provide a frictional sway control apparatus that may be adjusted quickly, conveniently and accurately so that a proper amount of friction is applied to the sway control bar.

It is a further object of this invention to provide a cam actuated frictional sway control apparatus, which eliminates the problems exhibited by conventional sway control devices that employ rotatable handles and which, in particular, eliminates overturning of the handle, overtightening of the sway control brake and resultant bending and/or breaking of the sway control bar and sway control mounting bracket.

It is a further object of this invention to provide a cam actuated frictional sway control apparatus, which may be conveniently and selectively tightened to minimize trailer sway at highway speeds and loosened to permit proper turning of the tow vehicle and trailer at low speeds.

It is a further object of this invention to provide a cam actuated frictional sway control apparatus, which automatically adjusts the sway bar in response to the sensed speed of the tow vehicle and trailer.

It is a further object of this invention to provide a cam actuated frictional sway control apparatus, which enables the proper sway bar tension to be selected quickly, accurately, effortlessly and reliably.

It is a further object of this invention to provide a cam actuated frictional sway control apparatus which enables proper sway bar tension to be adjusted using compact, lightweight and inexpensive, yet durable and highly effective disk springs.

It is a further object of this invention to provide a cam actuated friction sway control apparatus, which can be programmed to automatically adjust the friction on the sway bar in response to several different sensed speeds of the tow vehicle and trailer.

This invention features a cam actuated apparatus for frictionally controlling trailer sway. The apparatus includes a support frame mounted to the trailer and accommodating an elongate sway bar, which bar pivotally engages and extends generally rearwardly from a ball mount on a standard trailer hitch. A brake assembly is mounted to the support frame and includes first and second brake components sandwiched about the sway bar. The brake components are mounted so as to be selectively compressible and separable with respect to one another and the sway bar. There is a cam element and means are provided for mounting the cam element to the support frame such that the cam element is axially pivotable. Means are provided for pivotally driving the cam element into a selected one of a plurality of pivot positions. Resilient biasing means interengage the cam element and the brake assembly and are responsive to pivoting of the cam element into a selected position for applying a corresponding degree of compressive force to the first and second brake components. As a result, frictional interengagement between the brake components and the sway bar may be adjusted.

In a preferred embodiment, the cam element is pivoted between at least one pair of selected positions in a first direction to compress the resilient biasing means and increase the compressive force on the brake components such that frictional interengagement between the brake components and the sway bar is increased. The cam element may also be pivoted between at least one pair of selected positions in an opposite direction to relax the resilient biasing means and reduce the compressive force on the brake components such that frictional interengagement between the brake components and the sway bar is decreased.

The support frame may include a generally rectangular tube. The brake assembly may include spring means disposed between the first and second brake components for urging the brake components to separate and permitting the brake components to be compressed by the resilient biasing means when the cam element is rotated into at least one of the selected positions. The spring means may comprise at least one compression spring mounted on a pin attached to the support frame and extending through a pair of complementary slots respectively formed in the first and second brake components. Each brake component may include a brake pad or shoe, which engages a respective side of the sway bar, and a plate to which the pad is connected.

The means for mounting may include a cam mounting bracket to which the cam element is pivotally attached. The cam mounting bracket may be pivotally connected to the support frame proximate one end of the bracket. Means may be provided for pivotally adjusting the bracket relative to the support frame such that a selected interengagement force is exerted by the cam element on the resilient biasing means as the cam element is pivoted between selected positions. Means for driving may include an elongate handle connected to the cam element and extending outwardly from the cam mounting bracket. Means may be provided for restricting axial pivoting of the cam element to not more than a single rotation. Such means for restricting may include a pair of stop elements mounted to the bracket and being engagable by the handle as the handle is driven in respective opposite directions to restrict axial pivoting of the cam element.

In alternative embodiments, the means for driving may include a cam driver that is rotatably interengaged with the cam element. A motor rotates the cam driver; and means may be provided for sensing the speed of the trailer. Control means, responsive to the means for sensing, may be provided for directing the motor to rotate the cam driver a predetermined amount and thereby drive the cam element into a selected pivot position.

The resilient biasing means may include a bushing slidably mounted in the support frame and engaging the cam element. A receptacle may engage the first brake component and means defining a compression spring may be disposed within the receptacle. The compression spring means interengage the receptacle and the bushing. A reduced diameter bushing extension may be connected to the bushing and extend therefrom through the compression spring. Typically, the compression spring is defined by a plurality of disk springs comprising axially aligned Belleville washers.

BRIEF DESCRIPTION OF THE DRAWINGS

Other objects, features and advantages will occur from the following description of preferred embodiments and the accompanying drawings, in which:

FIG. 1 is a elevational front view of a preferred sway control apparatus according to this invention; which apparatus is interconnected between a standard trailer frame and a ball mount;

FIG. 2 is a top plan view of the sway control apparatus with the cam driving handle depicted in various selected positions;

DETAILED DESCRIPTION OF PREFERRED EMBODIMENTS

Figure 3:
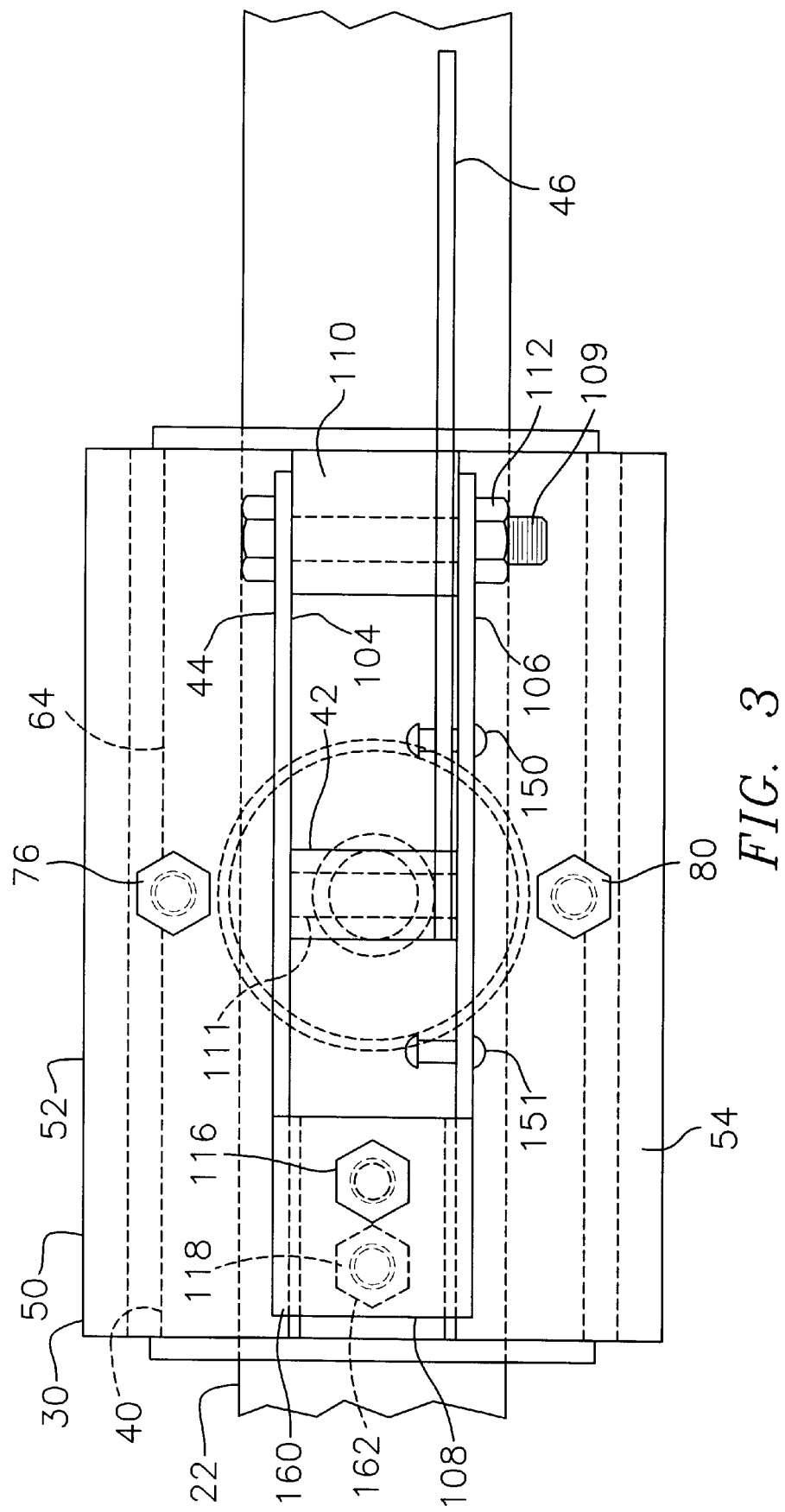
FIG. 3 is an elevational front view of the cam adjustable brake assembly and the sway bar to which the assembly is mounted.

There is shown in FIG. 1 a cam actuated apparatus 10 for frictionally controlling the sway or yaw exhibited by a trailer. Only a portion of the trailers frame 12 is depicted in FIGS. 1 and 2. It should be understood, however, that apparatus 10 may be employed with virtually all conventional trailers. Trailer frame 12 typically comprises an A-frame or other standard frame construction. The trailer frame is interengaged by a conventional hitch, not shown, to a tow vehicle, similarly not shown. As shown in FIG. 1, the hitch includes a standard ball mount 14 that carries a relatively small ball 16. Ball mount 14 is located adjacent a larger ball mount, (not shown) to which frame 12 is connected in a known manner. Ball 16 includes a depending portion 18 that is received by a complementary opening in mount 14. An appropriate nut assembly 20 secures ball 16 to ball mount 14 in a known manner. Apparatus 10 includes an elongate metal sway control bar 22 having a receptacle 24 formed at its inner end. Receptacle 24 receives ball 16 in the manner depicted best in FIG. 1. It should be understood that, in alternative embodiments, various other means may be used for connecting sway control bar 22 to the trailer hitch. The version shown resembles bars utilized by the prior art.

Traditionally, a sway bar is interengaged with a ball mount, in the above described manner, and a rearwardly extending portion of the sway bar is slidably interengaged with the trailer. As previously described, the known Reese sway control device employs a rotatable handle that permits the friction applied to the sliding sway bar to be adjusted for various driving conditions. The present condition replaces this means for adjustment with a cam actuated friction control mechanism. In particular, apparatus 10 includes a support frame 30, FIGS. 1 and 2, that is interengaged with and accommodates elongate bar 22. The support frame 30 is connected to a mounting bracket 32 by upper and lower bolts 34 and 36, respectively. Bracket 32 comprises a metal U-channel, which may include various shapes. The bracket is secured to trailer frame 12 by a plurality of bolts 38.

A number of components are carried by support frame 30. In particular, a brake assembly 40 is mounted in the frame and disposed about sway control bar 22. The brake assembly is operated by a cam element 42, which is pivotally mounted to support frame 30 by a cam mounting bracket 44. The cam element is pivotally driven by an elongate handle 46.

Each of the components recited above is depicted and explained in greater detail in connection with FIGS. 3, 4 and 5. Support frame 30 includes an elongate, generally tubular element 50 having a rectangular shape. Although a square or rectangular tube is particularly preferred, in alternative embodiments, the support frame may comprise various other configurations. Support frame 30 includes upper and lower walls 52 and 54, an inner wall 56 and an outer wall 58. These walls are formed unitarily from a durable and rugged metal tubing. The ends of the tubular support frame are open and sway control bar 22 extends longitudinally through the central channel 60 of frame 30.

Figure 4:
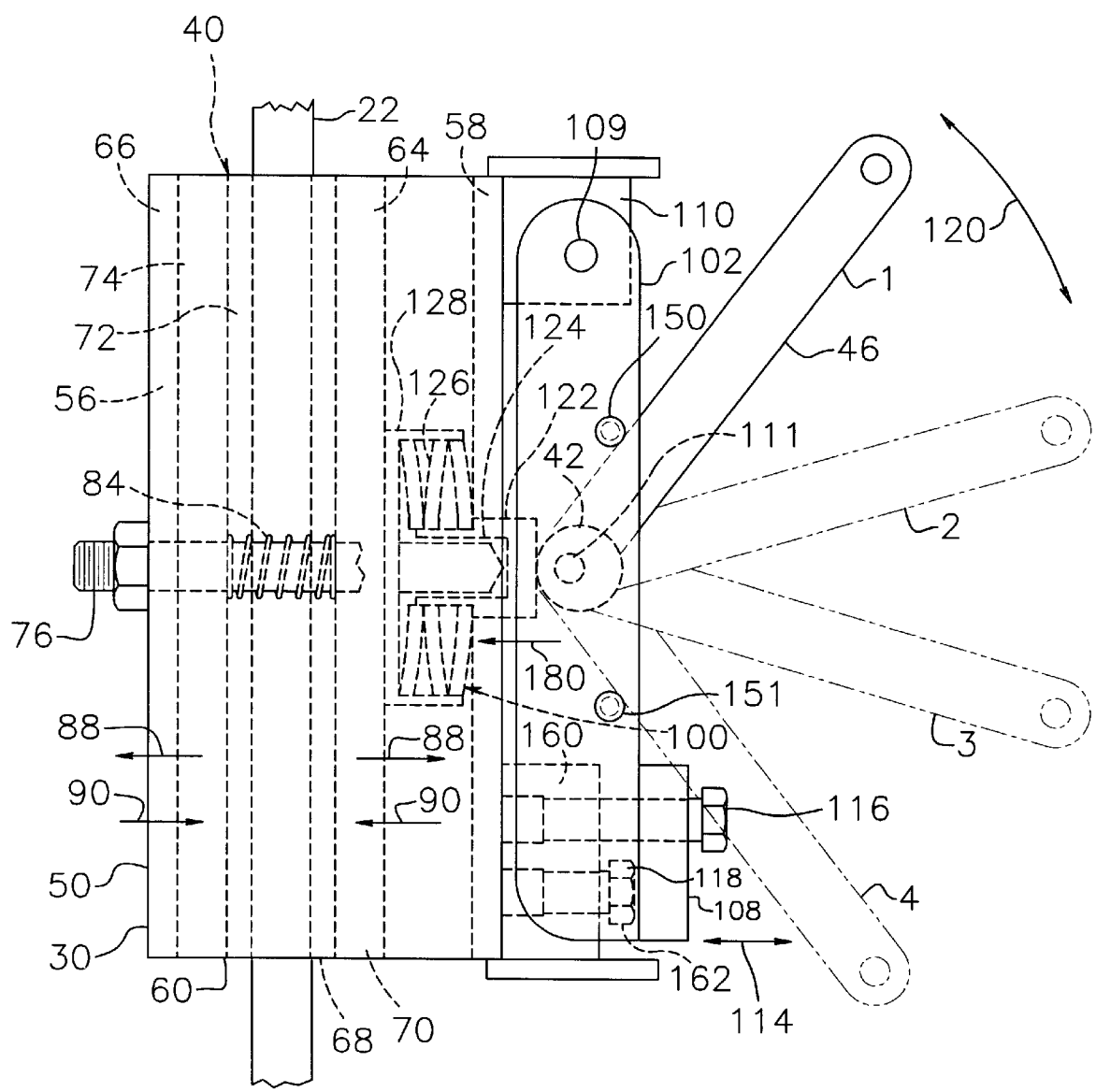
FIG. 4 is a top plan view of the brake assembly, the pivoting cam element and the resilient biasing means interengaging the brake assembly and the cam element; again, the cam driving handle is depicted in various selected positions which adjust the compressive force exerted by the brake assembly on the sway bar.
Figures 5, 6:
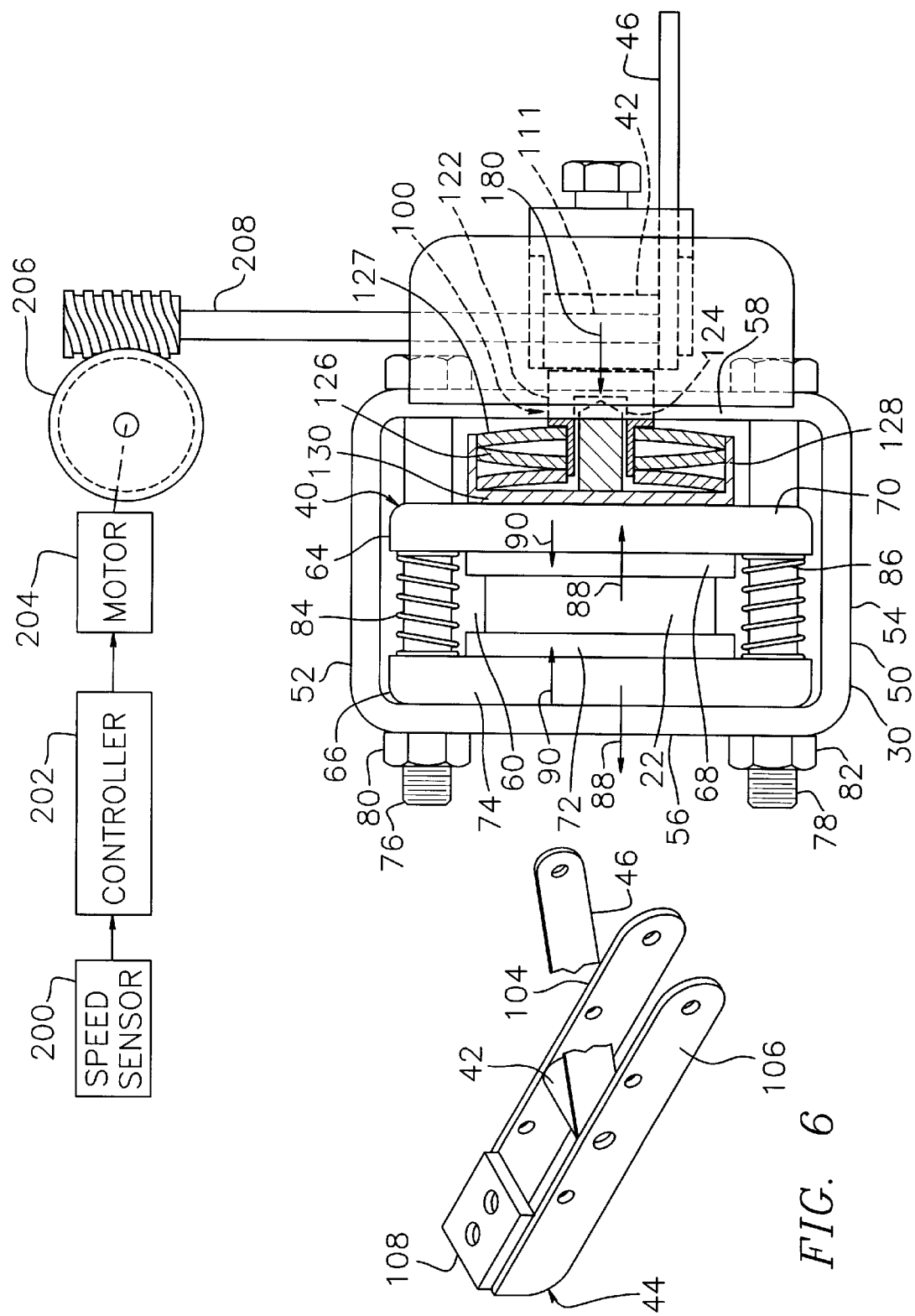
FIG. 5 is an elevational, side and partly cross sectional view of the control apparatus having a drive handle operably connected to the pivoting cam; an alternative automatic cam driving mechanism is depicted schematically.
FIG. 6 is a perspective view of the cam mounting bracket.

Brake assembly 40 is mounted within channel 60 of tubular frame 30 in the manner best shown in FIGS. 4 and 5. The brake assembly includes a first brake component 64 disposed on one side of bar 22 and a second brake component 66 disposed on the other side of the sway bar. More particularly, brake component 64 includes a brake pad or shoe 68 that is fastened adhesively or otherwise to a brake mounting plate 70. Likewise, brake component 66 includes a pad 72 that is secured to and carried by a brake mounting plate 74. The mounting plates and brake components may employ a construction of the type conventionally found in frictional sway control devices.

The brake components are prevented from moving longitudinally and vertically by a pair of upper and lower mounting pins 76 and 78, respectively. These pins are received through respective aligned openings in support frame walls 56 and 58. Each pin preferably comprises a bolt. Upper bolt 76 is held in place by a nut 80. Lower bolt 78 is similarly held in place by a nut 82. The upper and lower bolts interengage corresponding notches or recesses in the brake mounting plates 64 and 66. In particular, brake mounting plates 64 and 66 include a first pair of aligned recesses formed respectively in the top edges thereof. These aligned recesses receive and interengage bolt 76. A similar set of aligned recesses are formed on the bottom longitudinal edges of plates 64 and 66. These aligned recesses receive bolt 78. As a result, brake assembly 40 is restricted from moving longitudinally or up and down within support frame 30.

The brake components 64 and 66 are sandwiched about respective sides of sway bar 22. At least component 64 is movable transversely within tubular frame 30 by sliding mounting plate 70 along upper and lower bolts 76 and 78. Enough clearance is provided between the upper and lower recesses formed in plate 70 and the respective bolts 76 and 78 to permit this transverse movement. As a result, the brake components 64 and 66 are selectively compressible and separable with respect to one another and sway bar 22. Upper and lower compression springs 84 and 86 are disposed about upper and lower bolts 76 and 78, respectively. These springs urge the mounting plates 70 and 74, and thereby the brake components 64 and 66, apart as shown by arrows 88. Alternatively, springs 84 and 86 may be compressed, in a manner described more fully below, when the brake components are compressed against the sway bar, in the manner illustrated by arrows 90.

Brake assembly 40 is operated by cam element 42 and a resilient biasing assembly 100 that interengages the cam element and brake assembly 62. As best shown in FIGS. 3–6, cam element 42 comprises a generally cylindrical component that is mounted within cam mounting bracket 44. The cam mounting bracket includes upper and lower straps 104 and 106, which are interconnected by an outer plate 108. Straps 104 and 106 are themselves pivotally interconnected by a pivot pin 109 (FIGS. 3, 4) to a block 110, which is itself welded to wall 58 of frame 30. As best shown in FIG. 3, pin 109 may comprise a bolt, which is secured by a nut 112 to upper and lower straps 104 and 106. As a result, mounting bracket 44 is pivotable relative to support frame 30 in the manner illustrated by double headed arrow 114 in FIG. 4.

Cam element 42 comprises a generally cylindrical component, which is pivotally mounted between upper and lower straps 104 and 106. In particular, cam element 42 is mounted on a shaft 111, which is eccentrically offset from the axis of cylindrical cam element 42. In the preferred version shown in FIG. 3, pin 111 extends between upper and lower straps 104 and 106. The pin may be fixed to the straps and the cam may be pivotable about the pin. Alternatively, the pin may be fixed to the cam and pivotally mounted in the straps by respective bearings. In certain embodiments, the cam element and pin may comprise a single unitary component.

As illustrated in FIGS. 3–6, handle 46 is welded or otherwise fixedly interconnected to cam element 42. Turning the handle, in the manner indicated by double headed arrow 120 in FIG. 4, pivots cam element 42 between upper and lower straps 104 and 106.

Means are provided for restricting the pivoting of cam element 42 to not greater than one rotation. In fact, in most cases, the cam element is permitted to pivot through a much smaller angle. As illustrated in FIG. 4, the cam element and integrally attached handle are allowed to pivot approximately 90 degrees from position #1 to selected position #'s 2, 3 and 4. These do not constitute all of the permitted positions, however, and any number of intermediate handle positions may also be provided. The selected handle positions may be plainly designated by marking straps 104 and 106 with appropriate indicia, which correspond to those positions.

Pivoting of the handle and the cam element is limited by a pair of stop elements 150 and 151, which are carried by cam mounting bracket 40. As best illustrated in FIGS. 3 and 4, stop elements 150 and 151 may comprise rivets or similar elements that are secured to lower strap 106 on either side of cam element 42. Handle 46 is allowed to pivot between stop elements 150 and 151 but is prevented from pivoting beyond those stop elements. As a result, cam element 42 is permitted to pivot about shaft 111 through an angle of approximately 90 degrees.

Resilient biasing assembly 100 operably interengages cam element 42 and brake assembly 62. Assembly 100 includes a cup 128 that is mounted, within frame 30, to the outer wall of brake mounting plate 70. A plurality of disk springs 126, which preferably comprise Belleville washers, are stacked within cup 128 and arranged (axially aligned) in a known manner to define a compression spring. Assembly 100 further includes a bushing 122, which engages cam element 42 and is slidably received through an opening formed in wall 58 of support frame 30. A reduced diameter portion 133 of bushing 122 is received through the aligned central openings of springs 126. Bushing 122 includes a central slot 124, which receives a pointed pin 125 that extends from floor 130 of cup 128. The floor 130 of cup element 128 flushly engages the outer surface of mounting plate 70 of brake component 64. Pin 125 therefore extends between bushing 122 and the inside surface of cup floor 130. The distal end of the pin may be fixed to floor 130 in any acceptable manner.

Bushing 122 bears against the leading surface of the uppermost disk 127 in cup 128. As a result, when the bushing slides through support frame 30 toward brake assembly 40, as indicated by arrows 180 in FIGS. 5 and 7, the bushing pushes against the stack of resilient disks 126 and compresses the spring formed by those disks (see FIG. 7). This urges pin 125 to drive cup 128 against brake plate 70 in the direction of arrow 180. In this manner, the resilient biasing assembly 100 responds to pivoting of cam element 42 by applying a corresponding compressive force to brake assembly 40.

In operation, the user adjusts the frictional interengagement and load between brake assembly 40 and sway bar 22 by grasping handle 46 and turning that handle to a selected position that provides a corresponding, desired amount of frictional interengagement. For example, as shown in FIG. 4, when handle 46 is in position #1, a relatively narrow lobe of cam element 42 bears against bushing 122. The cam element does not push the bushing through the opening in support frame 30. The brake separation springs 84 and 86, and the resilient disk springs 126 therefore maintain a relaxed condition. A minimal degree of compressive force is exerted by the brake components on the sway bar. As a result, springs 84 and 86 urge brake components 64 and 66 apart, as indicated by arrows 88. Minimal (virtually zero) frictional interengagement is exhibited between the brake component 64 and bar 22. This permits the tow vehicle to sway and turn freely relative to the trailer. Such maneuvering is typically desirable at low speeds.

Figure 7:
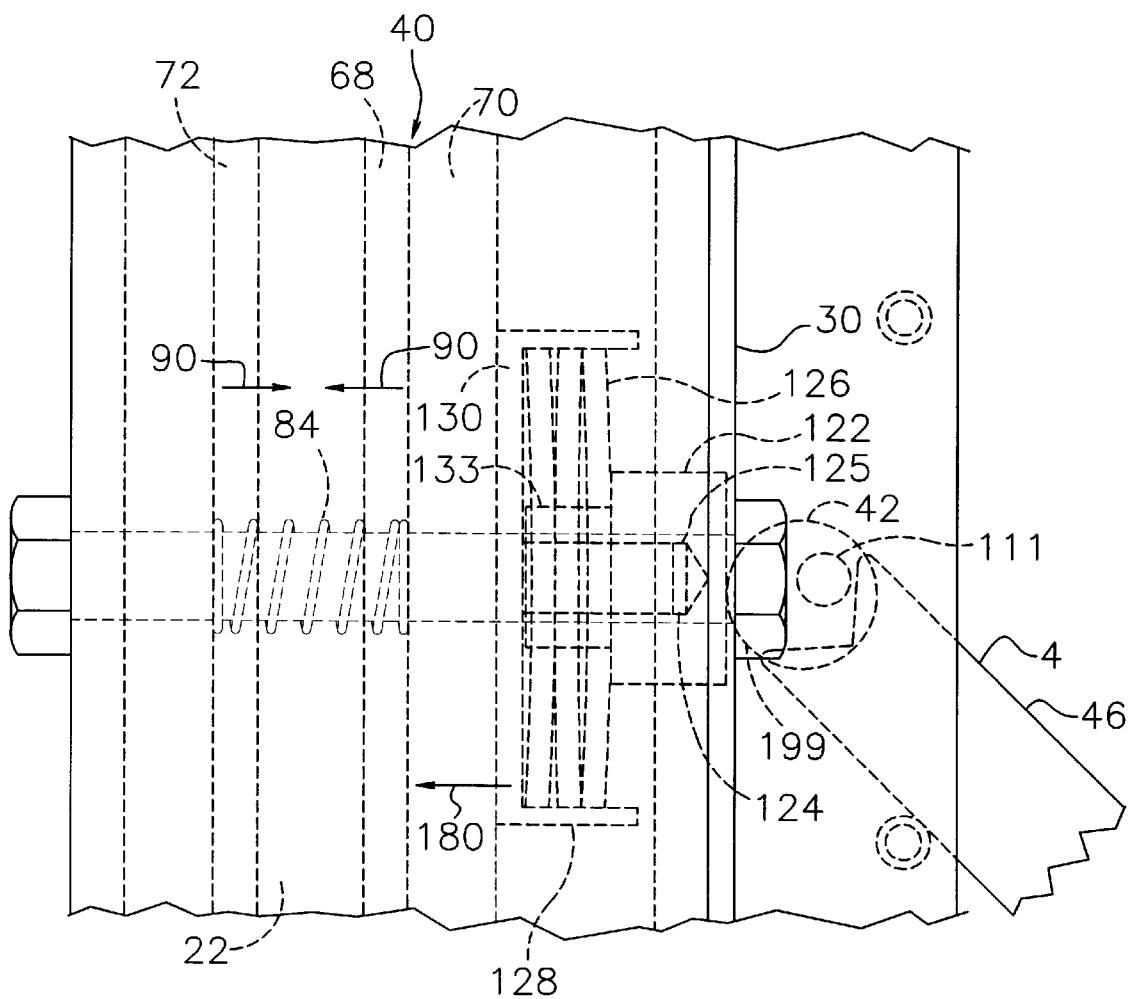
FIG. 7 is an enlarged, top plan view of the sway control apparatus particularly illustrating the cam element in a position which exerts a maximum degree of compressive stress against the brake assembly such that the brake assembly compresses against and frictionally interengages the sway bar to provide a tight, sway resistant interconnection between the trailer and the tow vehicle.

The compressive force between brake assembly 40 and bar 22 is progressively and selectively increased to reduce sway and improve handling. This is accomplished by turning handle 46 to a selected one of the positions #'s 2, 3 and 4. An enlarged view of cam element 42 and handle 46 in the maximally tightened position #4 is shown in FIG. 7. As handle 46 is pivoted between successively tighter positions, cam element 42 pivots eccentrically about shaft 111 and a correspondingly larger lobe of the cam element bears against bushing 122 of resilient biasing assembly 100. As a result, at each successive position, bushing 122 is pushed farther through the opening in support frame 30. A maximum thickness lobe 199 and corresponding camming force is depicted in FIG. 7. Cam element 42 urges bushing 122 through the support frame opening, and the bushing compresses disk springs 126 in the manner illustrated in FIG. 7. At the same time, the bushing pushes pin 125 through the aligned central openings of disks 126. This urges cup element 128 inwardly in the direction of arrow 180. As a result, cup floor 130 applies a compressive force against plate 70 of brake assembly 40. Plate 70 and attached pad 68 are urged frictionally against sway bar 22. Springs 84 and 86 are compressed, as indicated by arrows 90 and a compressive force is applied by pads 68 and 72 to bar 22, likewise in the manner indicated by arrows 90. This increases the frictional interengagement and load between the brakes and the sway bar, which decreases the amount of sway that is permitted between the trailer and tow vehicle. The amount of frictional interengagement and resulting sway is quickly and conveniently adjusted by simply rotating handle 46 and cam element 42 to any one of the selected positions. As a result, a corresponding lobe thickness of cam element 42 and a resulting pressure bears against resilient biasing assembly 100. This produces a corresponding compressive force, which is applied to brake assembly 40.

The biasing force or pressure applied by cam element 42 may also be adjusted by adjustment screws 116 and 118. As best shown in FIGS. 3 and 4, bolt 116 extends through an opening in plate 108 and is interengagable with a corresponding threaded opening in a block 160. A second adjustment bolt 118 includes a head 162 that engages the inside surface of plate 108. Bolt 118 threadably engages a second corresponding opening in block 160. Bolts 116 and 118 may be threadably adjusted to pivot bracket 102 inwardly toward and outwardly away from frame 30, as indicated by double headed arrow 114 in FIG. 4. This, in turn, adjusts the position of cam element 42 and the resultant pressure that the cam element applies to bushing 122 and resilient biasing means 100. As a result, the force required to turn the handle and resulting compressive forces that are applied to brake assembly 40 in the various pivot positions may be adjusted, as required, by the owner or operator of the trailer.

When the handle is turned to position #4, as shown in FIG. 7, a maximum desired degree of compressive force is applied to the brakes. This effectively ties the trailer and tow vehicle together as a single unit and minimizes swing. Similarly, apparatus 10 may be operated to quickly and conveniently loosen the frictional interengagement between the brake assembly and the sway control bar. This is accomplished by simply pivoting handle 46 in a reverse direction, such as from position #4 into positions #3, #2, and/or #1. As the handle is turned in this manner, the camming surface of element 42 is disengaged from bushing 122. Disk springs 126 and compression springs 84 and 86 relax. This causes the latter springs to separate the brake components from the sway control bar.

The following chart provides an example of the relationship between speed and frictional load at the various pivot positions of the cam.

| PIVOT POSITION # | MPH | LOAD | LOAD PERCENTAGE |
| --- | --- | --- | --- |
| 1 | 0 | 0 | 0 |
| 2 | 10 | 0 | 0 |
| 3 | 25 | 600 | 50 |
| 4 | 40 | 1200 | 100 |

Accordingly, at very slow speeds, the handle is set at positions #1 or #2 so that very little frictional load is provided. Turning the handle into position #3 or position #4 significantly increases the friction load so that sway is properly controlled at greater speeds (e.g. 25 MPH and above).

In certain embodiments, cam element 42 may be adjusted automatically in response to the speed of the tow vehicle and trailer. A mechanism for performing this automatic adjustment is shown schematically in FIG. 5. A conventional speed sensor 200 is interconnected to the speedometer cable, axle or other vehicle component that is speed dependent. Sensor 200 provides a signal, which is representative of the speed, to an analog or digital controller 202. The controller processes the signal and determines an appropriate positional setting for the cam element. Controller 202 then sends an appropriate signal to a motor 204. The motor drives a standard worm gear mechanism 206, which is, in turn, operably interconnected to a cam shaft 208. The cam shaft is axially interconnected to and drives shaft 111. As previously described, shaft 111 is operably interconnected to cam element 42.

Depending upon the speed that is sensed, the controller directs motor 204 to adjust cam shaft 208 so that cam element 42 is pivotally positioned to apply an appropriate compressive force to resilient biasing assembly 100 and brake assembly 40. For example, if a relatively high speed is sensed, controller 202 directs motor 204 to turn cam shaft 208 such that the camming lobe 199 engages bushing 122 in the manner illustrated in FIG. 7. As a result, frictional interengagement between the brake assembly and sway bar is increased and swaying at high speeds is reduced.

Conversely, when a low speed is sensed, motor 204 is directed to reverse and turn cam shaft 208 such that camming lobe 199 is disengaged from bushing 122. This results in less compressive force being applied to the brake assembly. Disk springs 126 and compression springs 84 and 86 are more relaxed; frictional engagement between the brake assembly and the sway bar is reduced; and turning is facilitated.

In the automatic embodiment, the controller is programmed and the motor is set to restrict the cam shaft from rotating more than a single rotation. This prevents the brake assembly from being overtightened and avoids resulting damage to the mounting bracket and/or sway control bar. The controller and motor may comprise a servo mechanism or other devices which should be understood to those skilled in the art.

Apparatus 10 enables the frictional interengagement between the brake assembly 40 and sway control bar 22 to be adjusted quickly, conveniently and accurately. Tedious tightening and guess work associated with rotatable tension springs are eliminated. Assorted locking positions, providing for corresponding degrees of frictional interengagement, may be conveniently marked on the bracket. Because the cam element is restricted in its range of movement, there is no danger of overtightening the device and causing resultant damage to the mounting bracket and/or sway control bar.

Typically, the individual pieces and parts of apparatus 10 are composed of durable and rugged metal and metal alloy materials. The particular materials and manufacturing techniques to be used should be understood to those skilled in the art.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A cam actuated apparatus for frictionally controlling the sway of a trailer, said apparatus comprising;
    a support frame mounted to the trailer and accommodating an elongate sway bar, which pivotally engages and extends generally rearwardly from a ball mount on a standard trailer hitch;
    a brake assembly mounted to said support frame and including first and second brake components sandwiched about the sway bar, said brake components being mounted so as to be selectively compressible and separable with respect to one another and the sway bar;
    a cam element;
    means for mounting said cam element to said support frame such that said cam element is axially pivotable;
    means for pivotally driving said cam element into a selected one of a plurality of pivot positions; and
    resilient biasing means interengaging said cam element and said brake assembly and being responsive to pivoting of said cam element into a selected pivot position for applying a corresponding degree of compressive force to said first and second brake components, whereby frictional interengagement between said brake components and the sway bar may be adjusted, said brake assembly further including spring means disposed between said first and second brake components for urging said brake components to separate and permitting said brake components to be compressed by said resilient biasing means when said cam element is rotated to at least one of said selected pivot positions.

2. The apparatus of claim 1 in which said supporting frame includes a generally rectangular tube.

3. The apparatus of claim 1 in which each said brake component includes a brake pad that engages a respective side of the sway bar and a plate to which said pad is connected.

4. The apparatus of claim 1 in which said spring means comprise at least one compression spring mounted on a pin that is attached to said support frame and extending through a pair of complementary slots formed respectively in said first and second brake components.

5. The apparatus of claim 1 in which said means for mounting include a cam mounting bracket to which said cam element is pivotably attached.

6. The apparatus of claim 5 in which said cam mounting bracket is pivotally connected to said support frame proximate one end of said bracket.

7. The apparatus of claim 1 further including means for restricting axial pivoting of said cam element to not more than a single rotation.

8. The apparatus of claim 1 in which said means for driving includes a cam driver that is rotatably interengaged with said cam element, a motor that rotates said cam driver means for sensing the speed of the trailer and control means, responsive to said means for sensing, for directing said motor to rotate said cam driver a predetermined amount and thereby drive said cam element into a corresponding, selected pivot position.

9. The apparatus of claim 1 in which said resilient biasing means include a bushing slidably mounted in said support frame and engaging said cam element, a receptacle engaging said first brake component and means defining a compression spring disposed within said receptacle and interengaging said receptacle and said bushing.

10. A cam actuated apparatus for frictionally controlling the sway of a trailer, said apparatus comprising;
    a support frame mounted to the trailer and accommodating an elongate sway bar, which pivotally engages and extends generally rearwardly from a ball mount on a standard trailer hitch;
    a brake assembly mounted to said support frame and including first and second brake components sandwiched about the sway bar, said brake components being mounted so as to be selectively compressible and separable with respect to one another and the sway bar;
    a cam element;
    means for mounting said cam element to said support frame such that said cam element is axially pivotable, said means for mounting including a cam mounting bracket to which said cam element is pivotably attached, said cam mounting bracket being pivotably connected to said support frame proximate one end of said bracket;
    means for pivotally driving said cam element into a selected one of a plurality of pivot positions; and
    resilient biasing means interengaging said cam element and said brake assembly and being responsive to pivoting of said cam element into a selected pivot position for applying a corresponding degree of compressive force to said first and second brake components, whereby frictional interengagement between said brake components and the sway bar may be adjusted.

11. The apparatus of claim 10 further including means for pivotally adjusting the bracket relative to said support frame such that a selected interengagement force is exerted by said cam element on said resilient biasing means as said cam element is pivoted between said selected pivot positions.

12. The apparatus of claim 10 in which said means for driving includes an elongate handle connected to said cam element and extending outwardly from said cam mounting bracket.

13. A cam actuated apparatus for frictionally controlling the sway of a trailer, said apparatus comprising;

a support frame mounted to the trailer and accommodating an elongate sway bar, which pivotally engages and extends generally rearwardly from a ball mount on a standard trailer hitch;

a brake assembly mounted to said support frame and including first and second brake components sandwiched about the sway bar, said brake components being mounted so as to be Selectively compressible and separable with respect to one another and the sway bar;

a cam element;

means for mounting said cam element to said support frame such that said cam element is axially pivotable;

means for restricting axial pivoting of said cam element to no more than a single rotation;

means for pivotally driving said cam element into a selected one of a plurality of pivot positions; and resilient biasing means interengaging said cam element and said brake assembly and being responsive to pivoting of said cam element into a selected pivot position for applying a corresponding degree of compressive force to said first and second brake components, whereby frictional interengagement between said brake components and the sway bar may be adjusted.

14. The apparatus of claim 13 in which said brake assembly further includes spring means, disposed between said first and second brake components for urging said brake components to separate and permitting said brake components to be compressed by said resilient biasing means when said cam element is rotated to at least one of said selected pivot positions.

15. The apparatus of claim 13 in which said means for mounting includes a cam mounting bracket to which said cam element is pivotally attached, said means for driving includes an elongate handle connected to said cam element and extending outwardly from said cam mounting bracket, and, said means for restricting includes a pair of stop elements mounted to said bracket and being engagable by said handle as said handle is driven in respective opposite direction to restrict axial pivoting of said cam element.

16. A cam actuated apparatus for frictionally controlling the sway of a trailer, said apparatus comprising;

a support frame mounted to the trailer and accommodating an elongate sway bar, which pivotally engages and extends generally rearwardly from a ball mount on a standard trailer hitch;

a brake assembly mounted to said support frame and including first and second brake components sandwiched about the sway bar, said brake components being mounted so as to be selectively compressible and separable with respect to one another and the sway bar;

a cam element;

means for mounting said cam element to said support frame such that said cam element is axially pivotable;

means for pivotally driving said cam element into a selected one of a plurality of pivot positions, said means for driving including a cam driver that is rotatably interengaged with said cam element, a motor that rotates said cam driver, means for sensing the speed of the trailer, and control means, responsive to said means for sensing, for directing said motor to rotate said cam driver a predetermined amount and thereby drive said cam element into a corresponding, selected pivot position; and resilient biasing means interengaging said cam element and said brake assembly and being responsive to pivoting of said cam element into a selected pivot position for applying a corresponding degree of compressive force to said first and second brake components, whereby frictional interengagement between said brake components and the sway bar may be adjusted.

17. A cam actuated apparatus for frictionally controlling the sway of a trailer, said apparatus comprising;

a support frame mounted to the trailer and accommodating an elongate sway bar, which pivotally engages and extends generally rearwardly from a ball mount on a standard trailer hitch;

a brake assembly mounted to said support frame and including first and second brake components sandwiched about the sway bar, said brake components being mounted so as to be selectively compressible and separable with respect to one another and the sway bar;

a cam element;

means for mounting said cam element to said support frame such that said cam element is axially pivotable;

means for pivotally driving said cam element into a selected one of a plurality of pivot positions; and resilient biasing means interengaging said cam element and said brake assembly and being responsive to pivoting of said cam element into a selected pivot position for applying a corresponding degree of compressive force to said first and second brake components, whereby frictional interengagement between said brake components and the sway bar may be adjusted, said resilient biasing means including a bushing slidably mounted in said support frame and engaging said cam element, a receptacle engaging said first brake component and means defining a compression spring disposed within said receptacle and interengaging said receptacle and said bushing.

18. The apparatus of claim 17 further including a reduced diameter bushing extension that is connected to said bushing and extends therefrom through said compression spring.

19. The apparatus of claim 17 in which said compression spring is defined by a plurality of disk springs.

20. The apparatus of claim 19 in which said disk springs comprise Belleville washers.

* * * * *